Oct. 25, 1938.  P. E. FENTON  2,134,037
FASTENER
Filed May 12, 1937

INVENTOR
Paul E. Fenton,
BY
Fraser, Myers & Manley
ATTORNEYS.

Patented Oct. 25, 1938

2,134,037

UNITED STATES PATENT OFFICE 2,134,037

FASTENER

Paul E. Fenton, Thomaston, Conn., assignor to Scovill Manufacturing Company, Waterbury, Conn., a corporation of Connecticut Application May 12, 1937, Serial No. 142,125

5 Claims. (Cl. 24—219)

This invention relates to improvements in separable fastener assemblies of the type widely used on such articles as gloves, pocketbooks and the like, for temporarily buttoning one part thereof to another; and in its more particular aspects to improvements in the construction of the stud member of such an assembly.

The principal object of the invention is to provide an inexpensive stud member, capable of fabrication from a single piece of sheet metal, and having a flared breast and annular retaining ring for cooperation with a pronged attaching cap in assembling the stud with a sheet of supporting material.

It is a further object of the invention to provide a stud of this general character which is particularly adapted for cooperation with a socket member of the type having a stud-engaging element, and in connection therewith to provide the stud with recesses, other than the usual socket-engaging neck, for accommodating various projecting parts of the socket whereby the two elements, when snapped together, may effectively be brought into closer relationship and thus occupy less space.

The full nature of the invention and other objects and features thereof will be more apparent from a consideration of the following description, when read in connection with the accompanying drawing, in which:—

Figure 1:
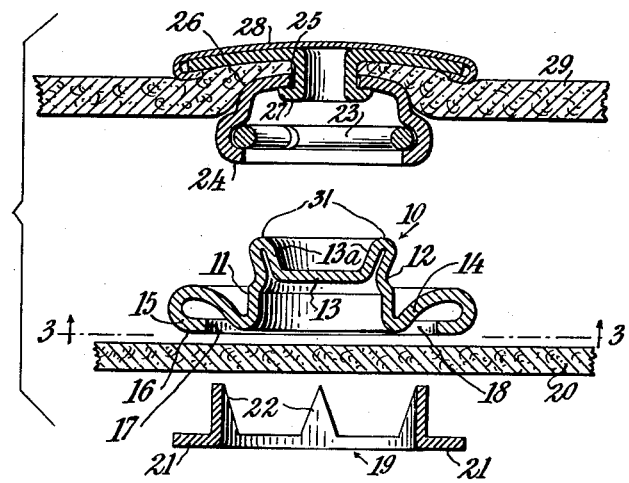
Figure 1 is a sectional view showing the stud element, a sheet of supporting material, and a pronged type cap for attaching the stud to the sheet; and a socket assembly of the split-ring type affixed to its supporting sheet and disposed above the stud.
Figure 3:
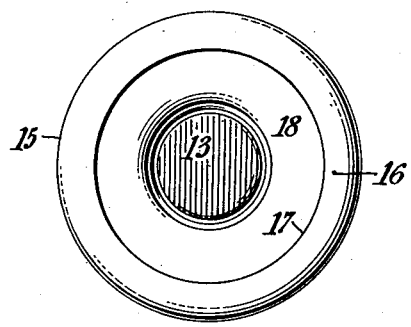
Fig. 3 is a plan view of the stud member of Fig. 1 looking upwardly from the bottom thereof in the direction indicated by the arrows 3—3.

Considering the drawing and referring first to Fig. 1, it will be seen that the stud 10 comprises a centrally-disposed post 11 having a contracted neck, or inwardly rolled bead, 12, for cooperation with the resilient retaining element of a socket assembly, a front wall 13 lying in the plane of this bead and providing radial support, both for the bead and the head of the stud, and a breast portion 14 flaring forwardly and outwardly from the rear end of the post and terminating in a reversely-turned annular ring 15, the latter two parts, as will later be apparent, being adapted to cooperate with a pronged cap element in attaching the stud to a supporting sheet of material.

In the preferred embodiment the stud is of one piece construction, and is made by pressing an appropriately shaped blank to form the cylindrical stud 11; then folding the imperforate wall into the front end of the post so that the disc portion 13 lies in the plane of and supports the bead 12, while the flange portions 13a reinforce the shoulders or front lip, 31; and then drawing the base of the stud outwardly and forwardly at an angle of approximately 45° to the horizontal; and finally rolling the outer margins of this breast rearwardly and inwardly to form the retaining ring 15.

The breast portion, as may be seen, is of such width, and is flared at such an angle, that the rear margin 16 of the retaining ring lies substantially in the plane defining the open rear end of the post, and terminates in an inner edge 17 which is spaced both axially and radially from the adjacent flaring breast so as to leave an annular entrance slot 18 through which the prongs of an appropriate attaching cap will pass, as will later be brought out.

The cap, or eyelet 19, which is used in attaching the stud to a supporting sheet such as 20, is illustrated in Fig. 1, and comprises, in essence, a radial flange 21 having a plurality of arcuately spaced pointed prongs 22 extending axially away therefrom.

In the attaching operation, which is usually done in an appropriate automatic machine (not shown), the parts are juxtaposed on opposite sides of the sheet, as shown in Fig. 1, and the prongs of the cap are then driven through the material, through the entrance slot and against the breast. As a result, they will be turned outwardly and their points will be clamped between the opposite faces of its retaining ring, thus effectively attaching one part to the other and compressing the intervening sheet between the rear surfaces of the stud and the flange 21.

The use of this type of attachment is particularly desirable because the prongs cut only very small holes in the material; and if the latter be knitted goods, then they merely spread the threads. However, its use involves some problems not encountered with other types of securing elements. The prongs, as may be seen, are normally unsupported, and may readily be bent during shipment or otherwise. In order to avoid undue loss it is essential that the stud element shall be capable of accommodating even such bent prongs. This is done in the present instance by making the entrance slot 18 relatively wide—from two to three, or more times the thickness of a cooperating prong, for example—and that is easily possible with the above described stud construction for the breast may be extended outwardly for any desired distance, and hence, the retaining ring may be terminated in any desired spaced relation thereto. It is of great importance, however, that the entire slot shall lie behind an outwardly flaring part of the breast, as shown, so that the prongs, when driven thereagainst, must, of necessity, be turned outwardly.

Figure 2:
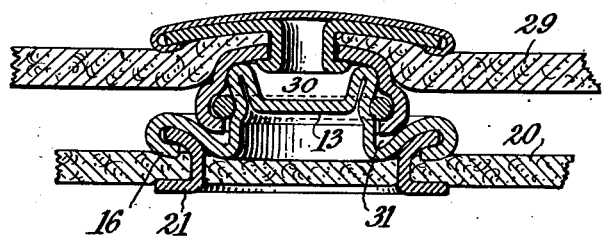
Fig. 2 is an elevational view, partly in section, showing the parts of Fig. 1 after the stud has been attached to its supporting sheet and after the socket member has been snapped over the stud.

The aforedescribed stud assembly is particularly adapted for cooperation with the split-ring type of socket assembly illustrated in Figs. 1 and 2. Briefly that assembly comprises a bell-shaped shell having a split spring ring 23 loosely held within its open mouth by an inturned lower lip 24, and an opening 25 in its rear shoulders 26 for receiving the rivet 27 of the attaching cap 28, the latter, of course, being adapted to compress the supporting material 29 between its rear face and the adjacent shoulders of the shell. Such an assembly, as is well recognized, has certain very decided advantages relating to ruggedness and the like, but, as may be seen, it is quite bulky and there are several depending parts, for which accommodation must be provided in the stud. It is in the provision of such accommodation that the present invention is particularly advantageous. Thus, and as may be seen in Fig. 2, the infolding of the stud head provides a recess 30 for the reception of the head of the socket attaching rivet 27, while the forwardly and outwardly flaring breast leaves a relatively wide annular trough 31 adjacent the base of the post for the reception of the open bell mouth part of the socket shell. This complementing of one depending part of one element by a recessed part of another permits their respective carrying sheets to be brought closer together when the socket is snapped on the stud, and, in effect, brings the elements themselves somewhat nearer to each other. In fact, the design is such that the front lip of the stud actually engages the shoulders of the shell while the inturned lip 24 of the shell engages the forward surface of the breast so that any strain imposed on the fastener, as, for example, when it is run through a mangle or is accidentally stepped upon, will be absorbed by the strongest parts, i. e., the socket cap, and the reinforced stud head and breast, and none will be imparted to the more delicate split-ring and cooperating neck. Furthermore, the strain will, in the final analysis, tend to compress the prongs more tightly within their retaining ring—not to separate any of the parts, as might be expected. Accordingly the entire assembly may be subjected to some very considerable abuse without in any way destroying its utility, a feature which is always important in this art.

Since certain changes may be made in the construction which are within the skill of the ordinary mechanic, it is intended that the foregoing shall be construed in a descriptive rather than in a limiting sense.

What I claim is:

1. A separable fastener stud member comprising a cylindrical stud post having an inwardly directed peripheral bead for cooperation with a complemental socket member, an integral cup shaped head with an imperforate disc-like wall lying in the plane of and with its periphery closely adjoining the socket-engaging bead to provide radial support for the latter; a breast portion flaring radially outward from the rear end of the post so as to define a relatively wide annular trough surrounding its base portion and forwardly so that its front surface lies in a plane substantially coinciding with the plane defining said bead in the post; and a retaining ring extending rearwardly and inwardly from the outer margin of the breast with its free inner edge spaced from the rear surface of the breast.

2. In combination with a socket assembly having a shell portion attached to a supporting sheet of material, a depending flared head, a split ring therein, and an inturned lower lip on the shell for retaining the split-ring; of a stud assembly comprising a cylindrical post having an inwardly directed circumferential bead adapted to cooperate with the split-ring of the socket, a front wall folded into the post to provide a recess accommodating a complemental part of the socket assembly and having an imperforate disc portion located in the plane of the bead with its edges closely adjacent thereto so as to provide radial support for the bead, a breast portion flaring outwardly and forwardly from the rear end of the post so as to leave an annular trough around its base of such dimensions as to accommodate the head and lip of the socket when its retaining ring is engaging the said bead, and a retaining ring turned rearwardly and inwardly from the outer margin of the breast with its inner edge lying substantially in the plane of the rear end of the post and spaced axially and radially from the rear surface of the breast; a sheet of supporting material disposed over the rear end of the stud; and a retaining ring having a radial flange engaging the sheet of material, and a plurality of arcuately spaced prongs extending forwardly from the flange through the sheet with their ends lying in and held by the retaining ring.

3. A one-piece separable fastener stud member adapted for cooperation with a split-ring type of socket assembly comprising a cylindrical stud post having a contracted neck for engagement with the split-ring of such a socket, an imperforate wall folded into the front end of the post with its disc portion lying in the plane of and with its periphery closely adjacent the neck so as to lend radial support thereto, a breast portion flared outwardly and forwardly from the base of the post at substantially 45° to the horizontal so as to define an annular trough surrounding the base which is adapted to accommodate the open bell mouth of such a socket member, and a retaining ring turned rearwardly and inwardly from the margins of the breast with its inner edge spaced both axially and radially from the flaring breast and lying substantially in the plane defining the rear end of the post.

4. A fastener stud member comprising a substantially cylindrical stud post with a peripheral socket-engaging neck therein; a breast portion, comprising an integral extension of the post, flaring forwardly-outwardly from its rear end so as to define a relatively wide annular trough surrounding the base of the post; and a retaining ring comprising an integral extension, rearwardly and inwardly from the outer margin of the breast, and terminating with its free edge spaced from the rear surfaces of the breast and lying in a plane which is substantially coincident with the plane defining the rear end of the post.

5. A fastener stud member according to claim 4 further characterized in that the socket engaging neck is formed near the head of the post; and in that the breast flares outwardly from the rear end of the post at approximately 45° to the adjacent surface of the post to form a V-shaped trough, and forwardly from that rear end so that its forwardmost surface lies in a plane parallel to and immediately behind the plane defining the said neck.

PAUL E. FENTON.